United States Patent [19]

Hersey

[11] Patent Number: 5,730,269
[45] Date of Patent: Mar. 24, 1998

[54] CENTRIFUGAL FRICTION CLUTCH

[75] Inventor: Richard A. Hersey, East Orleans, Mass.

[73] Assignee: Hersey Clutch Company, Orleans, Mass.

[21] Appl. No.: 537,234

[22] Filed: Sep. 29, 1995

[51] Int. Cl.$^6$ .................................................. F16D 43/18
[52] U.S. Cl. ............... 192/105 BA; 192/76; 192/107 T
[58] Field of Search ........................ 192/105 BA, 103 B, 192/76, 107 T, 54.5, 54.52, 93 R, 52.5

[56] References Cited

U.S. PATENT DOCUMENTS

| | | |
|---|---|---|
| 3,204,737 | 9/1965 | Anner ........................ 192/105 BA |
| 3,338,361 | 8/1967 | Hoff ........................... 192/54.5 X |
| 3,367,464 | 2/1968 | Fullerton et al. ............ 192/54.5 X |
| 3,627,089 | 12/1971 | Dence . |
| 4,016,963 | 4/1977 | St. John .................... 192/105 BA |
| 4,117,918 | 10/1978 | Silberschlag . |
| 4,610,343 | 9/1986 | Hikari ....................... 192/105 BA |
| 4,856,637 | 8/1989 | Gebhart . |
| 5,165,510 | 11/1992 | Lunati . |

FOREIGN PATENT DOCUMENTS

| | | | |
|---|---|---|---|
| 826724 | 4/1938 | France ..................... 192/105 BA |
| 1081875 | 12/1954 | France ..................... 192/105 BA |
| 546782 | 3/1932 | Germany ................. 192/105 BA |

*Primary Examiner*—Richard M. Lorence
*Attorney, Agent, or Firm*—Choate, Hall & Stewart

[57] ABSTRACT

A centrifugal friction clutch which can transmit torque and rotation has an input shaft, which is rotatable about an axis, and an output member. A plurality of shoes are constrained to rotate with the input shaft and arranged to move in a radial plane perpendicular to the input shaft axis. The shoes have a tapered profile with a narrower portion and a wider portion, with the narrower portion located further away from the axis of the input shaft. The output member of the clutch has an annular drum surrounding the shoes, and the drum includes surfaces which define a tapered cavity adapted to receive the shoes. The frictional engagement of the clutch is improved by the tapered geometry of the shoes and drum. A restraining spring is coupled to the shoes and adapted to urge the shoes radially inwardly. Above a predetermined rotation speed of the input shaft, centrifugal force causes the shoes to move along the radial plane to frictionally engage the drum thereby transmitting torque and rotation from the input shaft to the output member.

5 Claims, 2 Drawing Sheets

CENTRIFUGAL FRICTION CLUTCH

FIELD OF THE INVENTION

The present invention relates generally to the transmission of torque and power by use of a friction clutch. More specifically, the present invention pertains to centrifugal friction clutches in which frictional elements engage at a predetermined input shaft rotation speed thereby transmitting power from the input shaft to an output member.

DESCRIPTION OF THE PRIOR ART

Centrifugal friction clutches are useful because the input power source is disengaged from the output driven member, or freewheels, until a predetermined input shaft rotation speed is reached. Once the predetermined speed is reached, the clutch frictionally engages and torque is transmitted from the input shaft to an output member. These clutches are bidirectional, in that torque and power can be transmitted in both the clockwise and counterclockwise direction. When used with an electric motor, the clutch allows the motor to start and gain speed and horsepower before engagement thereby providing gradual acceleration of the lead and overcoming large inertia and starting torques. When used with an engine, the clutch permits the engine to idle with a complete disconnect between the engine and the lead. This allows the engine to reach a sufficiently high speed to produce enough torque to prevent stalling. Generally, these clutches have shoes attached to the input shaft and a drum is attached to the output member. The shoes and drum have frictional surfaces which, when engaged, transmit torque. Since centrifugal force increases gradually as a function of speed, clutches activated by centrifugal force do not provide an instant of engagement and usually are subjected to rubbing wear during engagement. Wear of the frictional surfaces is a problem with centrifugal clutches. One standard type of centrifugal clutch has shoes with flat, cylindrical surfaces. The mating drum is likewise cylindrical. With this design, the area of the fictional surface is simply a function of the radius and length of the cylindrical mating surface. The only technique to reduce wear on these particular frictional surfaces, for a given transmitted torque, is to increase the area of the cylindrical mating surface. The mass, volume, and weight of such a clutch can rapidly increase while attempting to design an assembly that will wear longer. Another centrifugal clutch, discussed in Gebhart, U.S. Pat. No. 4,856,637, employs a conical frictional surface and many parts, springs, screws, levers, and the like. The frictional surfaces of this clutch engage when centrifugal force causes force levers with cam surfaces mounted on a support member to press against a contact plate which then forces the singular pressure plate to engage the drum. The frictional surface area of this clutch is asymmetrical in the radial direction thereby creating sideload forces. Additionally, such a design employs a single pressure plate, or shoe, which may result in uneven wear. It would be desirable to provide a centrifugal clutch with greater frictional surface area, a more symmetrical frictional surface area for alignment, stability and even wear, and improved mechanical advantage for lessened wear per unit area. It would also be desirable to provide greater efficiency, fewer parts, a lighter weight assembly. The present invention meets these needs and provides a quiet, compact, and resilient form of bidirectional power transmission.

SUMMARY OF THE INVENTION

The present invention provides for a centrifugal friction clutch for transmission of torque from an input shaft to an output member. The input shaft has a plurality of shoes constrained to rotate, for the most part, with the input shaft, the shoes having a taper in the radial direction with the narrower portion being further away from the axis of the input shaft than the wider portion. The output member has a drum restrained to rotate with the output member, the drum having a cavity adapted to frictionally engage the shoes. A restraining spring is adapted to urge the shoes radially inward. Until the input shaft reaches a predetermined speed, there is a small amount of clearance between the shoes and the drum. When the input shaft reaches the predetermined speed, centrifugal force overcomes the restraining spring tension to eliminate the clearance whereby the tapered portion of the shoes frictionally engage the cavity of the drum.

In a preferred embodiment, cam rollers, one for each shoe, are interposed between the input shaft and the shoes. The cam rollers interact with a noncylindrical section of the input shaft to transmit torque to the shoes. The noncylindrical section provides cam action to the roller cam further enhancing the frictional engagement by wedging the shoes between the drum, roller cam and input shaft.

It is an object of the present invention to increase frictional surface area, maximize gripping power and reduce clutch size and weight. It is a further object of the present invention to increase frictional surface area thereby reducing the pressure per unit area and resulting in a reduction in clutch wear. It is a further object of the present invention to compensate for sideload forces from the output belt, chain, or gear drive.

The above and other objects, features, and advantages of the present invention will be more readily understood by persons skilled in the art when the following detailed description is evaluated in conjunction with the drawings.

DETAILED DESCRIPTION OF THE PREFERRED EMBODIMENT

Figure 3:
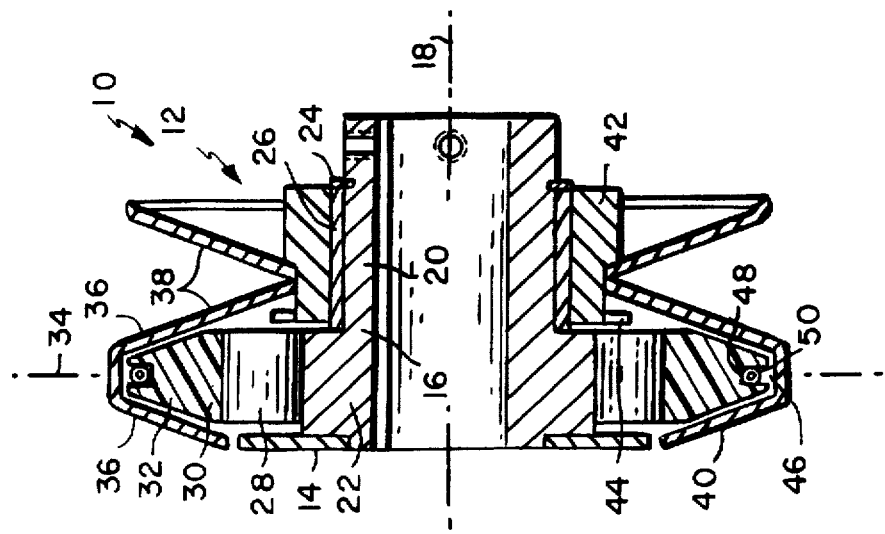
FIG. 3 is a sectional view of the clutch shown in FIG. 1 along line 3—3.
Figure 1:
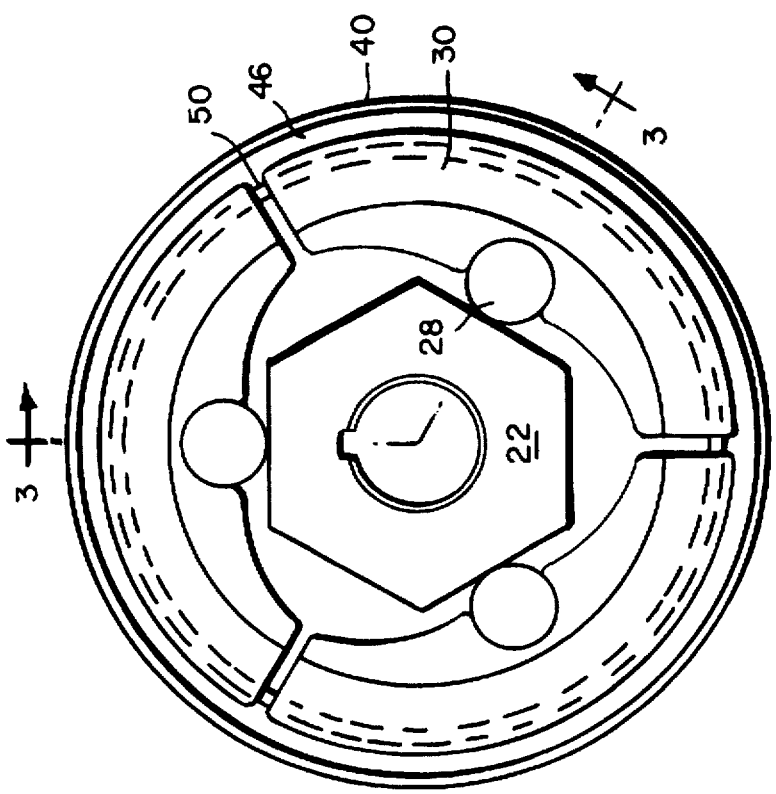
FIG. 1 is an end view through the cover plate of the centrifugal friction clutch in the disengaged configuration, according to this invention.

Referring to FIG. 1 and 3, a centrifugal friction clutch according to this invention is indicated generally by the reference numeral 10. The clutch 10 is contained in an output member 12 and a cover plate 14. An input shaft 16 transmits power to the output member 12 at or above a predetermined input shaft rotational speed.

The input shaft 16 is journaled for rotation about an axis 18 and is coupled to receive power from an engine, electric motor, or other power source (not shown). The input shaft 16 has a cylindrical section 20 and a noncylindrical section 22. A circumferential retaining ring 24 is partially embedded in the cylindrical section 20. The output member 12, having a greater diameter than the input shaft 16, also is journaled for rotation about axis 18 and may be coupled to any mechanism to which it is desired to transmit power (not shown). A bushing 26 being constrained in the axial direction by the circumferential retaining ring 24 and the noncylindrical section 22 of the input shaft 16, separates and decouples the input shaft 16 and the output member 12.

The noncylindrical section 22 of the input shaft 16 is in contact with cylindrical cam rollers 28. The axes of the cam rollers 28 are parallel to the axis 18 and the cam rollers 28 are arranged circumferentially around the noncylindrical section 22. The cam rollers 28 are each partially enveloped by a shoe 30 such that the shoe 30 is constrained in the angular direction by the cam roller 28, but each shoe 30 remains free to rotate with respect to the axis of the corresponding cam roller 28. The cam rollers 28 and shoes 30 are configured such that the shoes 30 comprise a concentric ring around the input shaft 16. The shoes 30 are annular and have a tapered configuration 32 about a radial plane 34 substantially perpendicular to the axis 18 of input shaft 16 such that the narrower end of the tapered portion is further away from the axis 18 than the wider end. The tapered configuration 32 includes two frictional surfaces 36.

The output member 12 includes a pulley face 38 and a drum 40 both attached to an output shaft 42. A roller retaining ring 44 is circumferentially attached to the output shaft 42. The roller retaining ring 44, in conjunction with the cover plate 14, serves to restrain the cam rollers 28 in the axial direction. The pulley face 38 is used to transmit power via a V-belt (not shown) or may be adapted for a belt, chain, sprocket and the like (also not shown). The drum 40 is annular and includes a drum cavity 46. The drum cavity 46 is adapted to circumferentially surround, receive and frictionally engage the tapered configuration 32 of the shoes 30. When the clutch 10 is disengaged, there is clearance between the shoes 30 and the drum 40.

Each shoe 30 has an annular channel 48 adapted to receive a restraining spring 50. The restraining spring 50, annular in shape, encircles and biases the shoes 30 and the cam rollers 28 radially inward towards the axis 18. The clutch 10 is disengaged when the input shaft 16 is at a standstill or rotating at speeds below the predetermined engagement speed. FIG. 1 depicts the positional relationships between the input shaft noncylindrical section 22, cam rollers 28, shoes 30, and drum 40 when the input shaft 16 is at a standstill.

As the input shaft 16 begins rotating, the cam rollers 28 and shoes 30 remain constrained to rotate substantially with the input shaft 16 by the restraining spring 50 and input shaft noncylindrical section 22. As the rotation speed increases, centrifugal force urges the cam rollers 28 and the shoes 30 radially outward from the axis 18. The centrifugal force causes the cam rollers 28 to move along the surface of the noncylindrical section 22. Likewise, the centrifugal force causes the shoes 30 to move with the cam rollers 28. With respect to the input shaft 16, the cam rollers 28 and the shoes 30 move in both the circumferential and radial direction. The tension of the restraining spring 50 keeps the input shaft 16, cam rollers 28, and shoes 30 in contact with each other. The tension of the restraining spring 50 constrains the shoes 30 such that clearance is maintained between the shoes 30 and the drum 40 while the input shaft 16 rotates at speeds lower than the predetermined speed.

Figure 2:
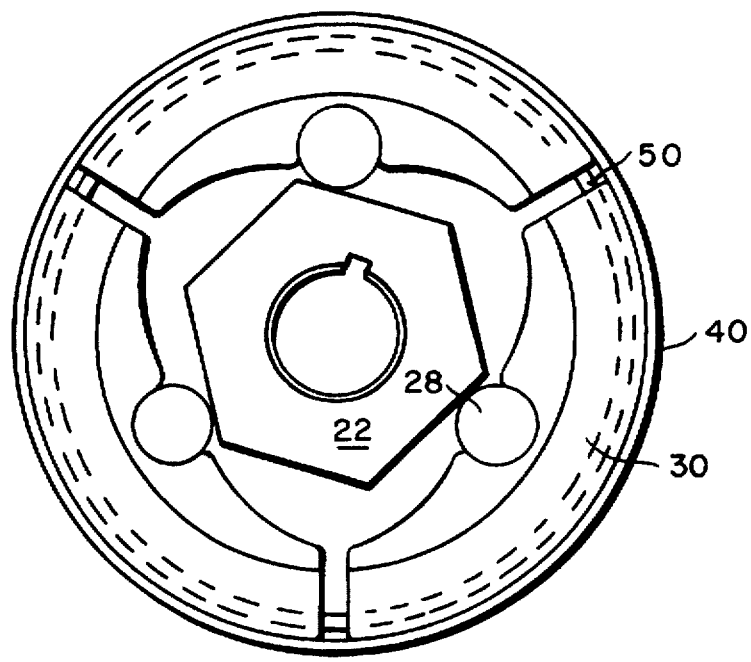
FIG. 2 is an end view of the clutch in the engaged configuration.

When the rotation speed of the input shaft 16 is at the predetermined speed and greater, the outward movement of the shoes 30 in the radial direction reaches the point where the frictional surfaces 36 of shoes 30 come in contact with the drum cavity 40 and they frictionally engage. Cam action, between the input shaft noncylindrical section 22 and the cam rollers 28, wedges the cam rollers 28 and shoes 30 between the drum 40 and the input shaft 16, further enhancing the frictional engagement. FIG. 2 depicts the clutch 10 in the engaged position.

The shoe tapered configuration 32 and drum cavity 46 cross-section is symmetric about the radial plane 34, thereby eliminating any internal imbalance. This cross-sectional symmetry also serves to compensate for any sideload forces resulting from the driven load on the pulley face 38. Additionally, the tapered geometry serves to provide a frictional wedging engagement between shoes 30 and the drum 40. In an alternative embodiment, the tapered configuration may be altered to be asymmetric about the radial plane 34 to further compensate for forces on the pulley face 38. In this configuration, however, the tapered configuration 32 still includes two frictional surfaces 36. The tapered configuration 32 and drum cavity 46 also serve to provide more engagement surface area, thereby reducing clutch wear and allowing for reduced clutch dimensions and weight.

Figure 4:
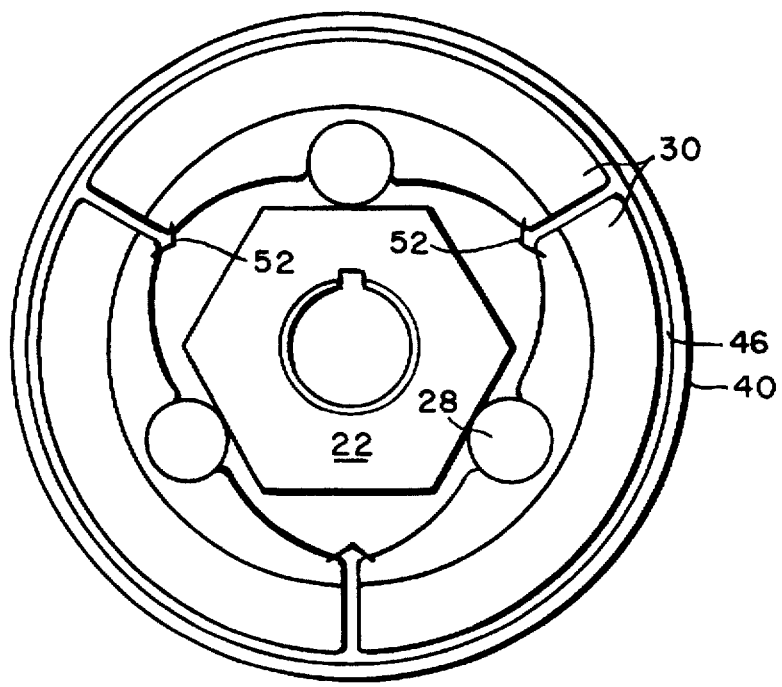
FIG. 4 is an end view of the clutch in an alternative embodiment.

Optionally, as illustrated in FIG. 4, a modified form of the restraining spring 50 is depicted. The restraining spring 50 comprises a clip spring 52 for each shoe 30. The clip springs 52 are attached to the shoes 30 via holes or posts on the shoe 30 such that each shoe 30 is coupled to the two adjacent shoes 30.

While there is described herein what are considered to be preferred embodiments of the present invention, other modifications of the invention will become apparent to those skilled in the art from the teaching herein. It is therefore desired to be secured in the appended claims all such modifications as fall within the true spirit and scope of the invention.

What is now claimed is:

1. A centrifugal friction clutch for transmission of power from an input shaft which is rotatable about an axis to an output member comprising:

a plurality of shoes constrained to rotate substantially with the input shaft, and arranged to move in a radial plane perpendicular to the input shaft axis, the shoes having a tapered configuration with a narrower portion and a wider portion, the narrower portion being further away from the axis of the input shaft;

the output member comprising an annular drum surrounding the shoes, the drum including a cavity adapted to receive the shoes;

only one cam roller corresponding to each shoe, each cam roller interposed between a noncylindrical section of the input shaft and an approximate center of a corresponding shoe, the noncylindrical section providing cam action to the cam roller to wedge the shoes between the drum and the input shaft; and a restraining spring adapted to urge the shoes radially inwardly, whereby above a predetermined speed, the shoes frictionally engage the drum thereby transmitting torque from the input shaft to the output member.

2. The centrifugal friction clutch of claim 1 wherein the tapered configuration of the shoes and the drum cavity are symmetric about the radial plane.

3. The centrifugal friction clutch of claim 1 wherein three shoes are arranged circumferentially about the input shaft.

4. The centrifugal friction clutch of claim 1 wherein the shoes each include a channel adapted to circumferentially accept the restraining spring.

5. A centrifugal friction clutch for transmission of power from an input shaft rotatable about an axis to an output member comprising:

three shoes constrained to rotate substantially with the input shaft, and arranged to move in a radial plane with respect to the input shaft, the shoes having a tapered configuration with two frictional surfaces symmetric about the radial plane with a narrow portion of the tapered configuration being further away from the axis of the input shaft;

the output member comprising an annular drum surrounding the shoes, the drum including a cavity adapted to receive the shoes;

a restraining spring adapted to urge the shoes radially inwardly, whereby above a predetermined speed, the shoes frictionally engage the drum thereby transmitting torque from the input shaft to the output member; and only one cam roller corresponding to each shoe and each cam roller being interposed between the input shaft and the corresponding shoe, the input shaft having a noncylindrical section, the noncylindrical section providing cam action to the cam roller, thereby wedging the shoes between the drum and the input shaft and further enhancing the frictional engagement.

* * * * *

UNITED STATES PATENT AND TRADEMARK OFFICE
CERTIFICATE OF CORRECTION

PATENT NO. : 5,730,269

DATED : March 24, 1998

INVENTOR(S) : Richard A. Hersey

It is certified that error appears in the above-identified patent and that said Letters Patent is hereby corrected as shown below:

Column 1, line 22: please delete "lead"; and insert --load-- therefor

Column 1, line 25: please delete "lead"; and insert --load-- therefor.

Column 1, line 38: please delete "fictional"; and insert --frictional-- therefor.

Column 3, line 13: please delete "ting"; and insert --ring-- therefor.

Column 6, line 3: please correct the left margin.

Signed and Sealed this

Twentieth Day of July, 1999

Attest:

Q. TODD DICKINSON

*Attesting Officer*    *Acting Commissioner of Patents and Trademarks*